(12) United States Patent
Steinke

(10) Patent No.: US 11,669,416 B1
(45) Date of Patent: Jun. 6, 2023

(54) USING A LOGICAL OPERATION COALESCER TO ENABLE RECOVERY FROM UPDATE FAILURES TO A SHARED DATA STORE

(71) Applicant: Dell Products L.P., Round Rock, TX (US)

(72) Inventor: Ron Steinke, Tacoma, WA (US)

(73) Assignee: DELL PRODUCTS, L.P., Round Rock, TX (US)

(*) Notice: Subject to any disclaimer, the term of this patent is extended or adjusted under 35 U.S.C. 154(b) by 0 days.

(21) Appl. No.: 17/587,310

(22) Filed: Jan. 28, 2022

(51) Int. Cl.
  *G06F 11/00* (2006.01)
  *G06F 11/14* (2006.01)

(52) U.S. Cl.
  CPC ...... *G06F 11/1474* (2013.01); *G06F 2201/82* (2013.01)

(58) Field of Classification Search
  CPC .... G06F 11/1474; G06F 16/219; G06F 16/23; G06F 16/2308; G06F 16/2329; G06F 16/2343; G06F 16/2358; G06F 16/2365; G06F 16/27; G06F 2201/82; G06F 9/466
  See application file for complete search history.

(56) References Cited

U.S. PATENT DOCUMENTS

| | | | | |
|---|---|---|---|---|
| 8,560,511 B1* | 10/2013 | Matthews | ............ | G06F 40/166 707/704 |
| 2005/0022047 A1* | 1/2005 | Chandrasekaran | ........................ | G06F 16/2343 707/E17.007 |
| 2016/0371318 A1* | 12/2016 | Hillel | .................. | G06F 16/2365 |
| 2017/0199704 A1* | 7/2017 | Guney | .................... | G06F 9/524 |
| 2022/0300335 A1* | 9/2022 | Venkatesh | ........... | G06F 11/3006 |

OTHER PUBLICATIONS

Steinke, Ron. "Using a Logical Operation Coalescer to Concurrently Update File System Objects", U.S. Appl. No. 17/587,531, filed Jan. 28, 2022, 46 pages.

* cited by examiner

*Primary Examiner* — Michael Maskulinski
(74) *Attorney, Agent, or Firm* — Amin, Turocy & Watson, LLP

(57) ABSTRACT

The technologies described herein are generally directed toward maintaining data coherence after an updating node fails during an update. According to an embodiment, a system can comprise a processor and a memory that can enable performance of operations including, based on first updating activity by first updating equipment, locking a portion of a data structure for updates with a lock, where the first updating equipment has been determined to have abnormally ceased the first updating activity, resulting in an update activity failure. The operations can further include receiving, by the computing equipment, from second updating equipment, an indication of the update activity failure, during second updating activity of the portion. Further, the operations can include, based on the indication, reconciling, by the computing equipment, the second updating activity and the update activity failure.

20 Claims, 10 Drawing Sheets

USING A LOGICAL OPERATION COALESCER TO ENABLE RECOVERY FROM UPDATE FAILURES TO A SHARED DATA STORE

BACKGROUND

Modern data storage systems can facilitate the storage and manipulation of many types of data by large numbers of client nodes. Different approaches can be used to improve the security, performance, and scalability of data storage, retrieval, and manipulation operations. In some circumstances different approaches can conflict. For example, to improve scalability of data access capabilities, systems can increase the numbers of clients that can access data concurrently. Concurrent access however can interfere with the security of the accessed data, e.g., for some systems, changes made by multiple clients must be actively managed to remain coherent.

Different ways to promote scalable coherence include the use exclusive locks of different scope, as well as selective caching and serialization of changes. Within complex data storage systems, problems can occur when failure occur in data manipulation nodes. There problems can be enhanced when recovery implicates different system goals, e.g., security, coherent scalability, and performance.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to, based on first updating activity by first updating equipment, lock a portion of a data structure for updates with a lock, where the first updating equipment has been determined to have abnormally ceased the first updating activity, resulting in an update activity failure for the first updating activity. Further, the instructions can include an instruction to receive, from second updating equipment, an indication of the update activity failure, during second updating activity of the portion. The instructions can further include an instruction to, based on the indication, reconcile the second updating activity and the update activity failure.

An example method can comprise, based on first updating activity by first updating equipment, locking a portion of a data structure for updates with a lock, where the first updating equipment has been determined to have abnormally ceased the first updating activity, resulting in an update activity failure for the first updating activity. Further, the method can include receiving, from second updating equipment, an indication of the update activity failure, during second updating activity of the portion. The method can further include, based on the indication, reconciling the second updating activity and the update activity failure.

An example non-transitory computer-readable medium can comprise instructions that, in response to execution, cause a system comprising a processor to perform operations. These operations can comprise, based on first updating activity by first updating equipment, lock a portion of a data structure for updates with a lock, wherein the first updating equipment has been determined to have abnormally ceased the first updating activity, resulting in an update activity failure for the first updating activity. Further, the operations can include an operation to receive, from second updating equipment, an indication of the update activity failure, during second updating activity of the portion. The operations can further include an operation to, based on the indication, reconcile the second updating activity and the update activity failure.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate recovery when updating nodes abnormally cease update operations. One or more embodiments can use different approaches to recovering from update activity failures, without adversely affecting system performance, e.g., recovery while promoting system scalability, performance, and coherency.

As is understood by one having skill in the relevant art(s), given the description herein, the implementation(s) described herein are non-limiting examples, and variations to the technology can be implemented. For instance, even though many examples described herein discuss concurrent changes to file system objects (e.g., using extended attributes of inodes), the technologies described herein can be used in many applicable circumstances, e.g., when approaches to promoting performance, concurrency, and coherence are applied to any type of concurrently updated data. As such, any of the embodiments, aspects, concepts, structures, functionalities, implementations and/or examples described herein are non-limiting, and the technologies described and suggested herein can be used in various ways that provide benefits and advantages to data manipulation system technology in general, both for existing technologies and technologies in this and similar areas that are yet to be developed.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
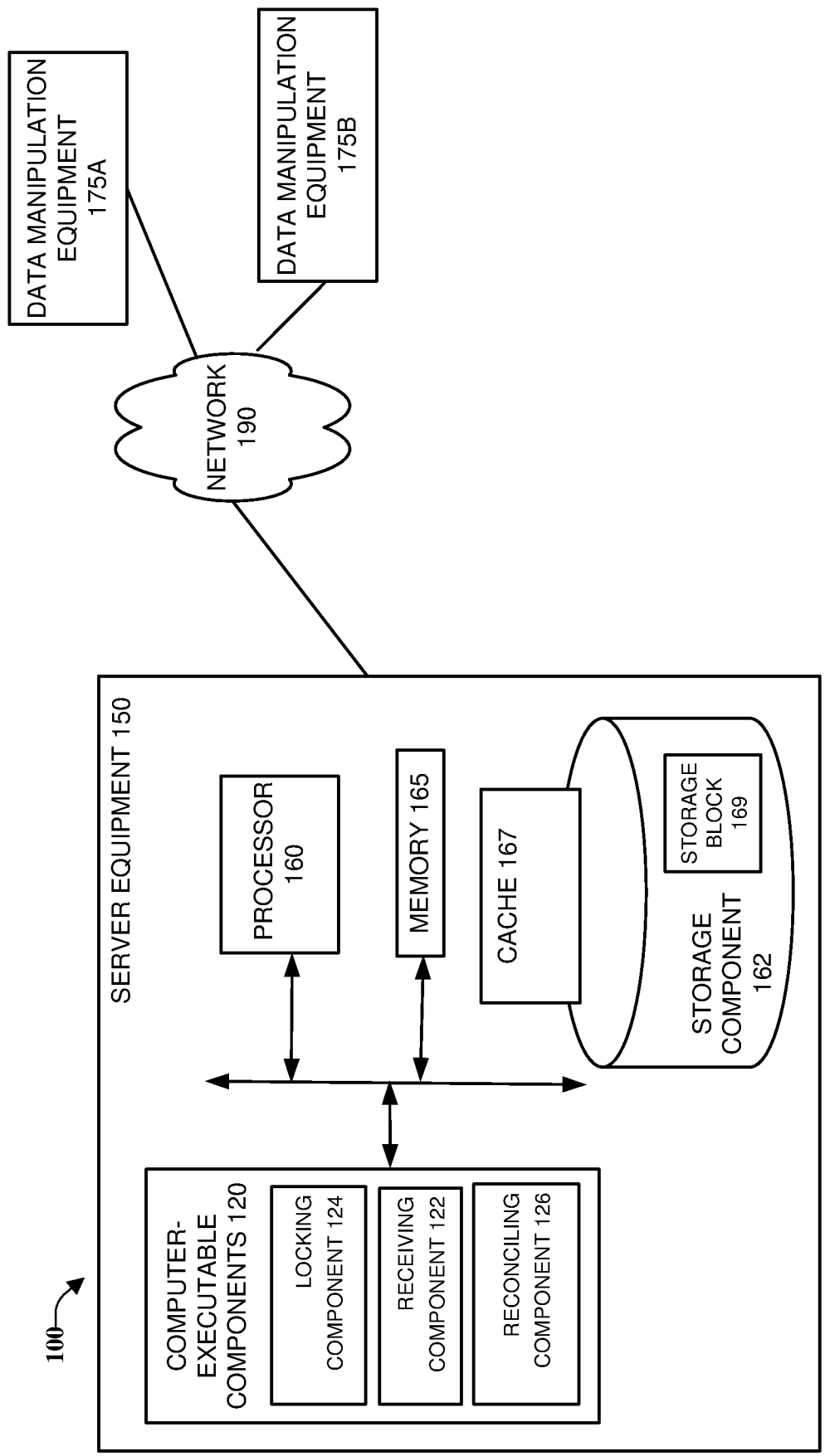
FIG. 1 is an architecture diagram of an example system that can facilitate recovery when updating nodes abnormally cease update operations, in accordance with one or more embodiments.

FIG. 1 is an architecture diagram of an example system 100 that can facilitate recovery when updating nodes abnormally cease update operations, in accordance with one or more embodiments. For purposes of brevity, description of like elements and/or processes employed in other embodiments is omitted. As depicted, system 100 includes server equipment 150 connected to data manipulation equipment 175A-B, via network 190. As depicted, server equipment 150 can include storage component 162 with storage block 169.

According to multiple embodiments, server equipment 150 can include memory 165 that can store one or more computer and/or machine readable, writable, and/or executable components 120 and/or instructions. In embodiments, server equipment 150 can further include processor 160. In one or more embodiments, computer-executable components 120, when executed by processor 160, can facilitate performance of operations defined by the executable component(s) and/or instruction(s). Computer executable components 120 can include receiving component 122, locking component 124, reconciling component 126, and other components described or suggested by different embodiments described herein, that can improve the operation of system 100.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure. In some embodiments, cache 167 can comprise non-volatile random access memory (NVRAM), with different uses including journaled manipulation of storage component 162 data and the enabling of concurrent updating of some types of stored data, in accordance with one or more embodiments.

It is understood that the computer processing systems, computer-implemented methods, apparatus, and computer program products described herein employ computer hardware and/or software to solve problems that are highly technical in nature (e.g., handling complex concurrent updates of data at the logical and physical levels), that are not abstract and cannot be performed as a set of mental acts by a human. For example, a human, or even a plurality of humans, cannot efficiently handle the locking and merging of concurrent changes with a level of accuracy and/or efficiency as the various embodiments described herein.

In one or more embodiments, memory 165 can store computer and/or machine readable, writable, and/or executable components 120 and/or instructions that, when executed by processor 160, can facilitate execution of the various functions described herein relating to receiving component 122, locking component 124, reconciling component 126, as well as other components to implement and provide functions to system 100, and some other embodiments described herein.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of locking component 124, which can in some implementations, based on first updating activity by first updating equipment, lock a portion of a data structure for updates with a lock, where the first updating equipment has been determined to have abnormally ceased the first updating activity, resulting in an update activity failure for the first updating activity. As discussed with FIGS. 3-5 below, one or more embodiments can, based on first updating activity by data manipulation equipment 175A, lock a portion of a data structure in cache 167 for updates with a lock, wherein the first updating equipment has been determined to have abnormally ceased the first updating activity, resulting in an update activity failure for the first updating activity.

In one or more embodiments, computer executable components 120 can further be used in connection with implementing additional systems, devices, components, and/or computer-implemented operations shown and described in connection with FIG. 1 or other figures disclosed herein. In another example, memory 165 can store executable instructions that can facilitate generation of receiving component 122, which can in some implementations receive from second updating equipment, an indication of the update activity failure, during second updating activity of the portion. As discussed with FIGS. 3-5 below, one or more embodiments can receive from data manipulation equipment 175B, an indication of the update activity failure, during second updating activity of the portion stored in cache 167.

In another example, memory 165 can store executable instructions that can facilitate generation of reconciling component 126, which can in some implementations, can, based on the indication, reconcile the second updating activity and the update activity failure. As discussed with FIGS. 3-5 below, one or more embodiments can, based on the indication, reconcile the second updating activity by data manipulation equipment 175B and the update activity failure of data manipulation equipment 175B.

It is appreciated that the embodiments of the subject disclosure depicted in various figures disclosed herein are for illustration only, and as such, the architecture of such embodiments are not limited to the systems, devices, and/or components depicted therein. For example, in some embodiments, server equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that server equipment 150, data manipulation equipment 175A-B, and other devices discussed herein, can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as server equipment 150. For example, one or more of server equipment 150, and data manipulation equipment 175A-B can all be separate subsystems running in the kernel of a computing device as well as operating on separate network equipment, e.g., as depicted in FIGS. 1 and 2.

As described in some examples below, an example system that can benefit in some circumstances from the use of one or more embodiments, is a system that can facilitate sharing resources among networked computing devices, e.g., file storage systems and databases. In some implementations, system 100 can be a file storage system that implements data protection systems. In different implementations, data protection systems can benefit from the concurrent operations that one or more embodiments can facilitate, e.g., via a selection of locks of different scope.

Example data protection systems which can employ one or more of the approaches described with embodiments herein include, but are not limited to EMC ISILON®, an example network attached storage (NAS) platform provided by DELL EMC, Inc. Example storage array devices which can employ one or more of the approaches described with embodiments herein include, but are not limited to, POWERMAX® enterprise data storage array system provided by DELL EMC, Inc.

Figure 2:
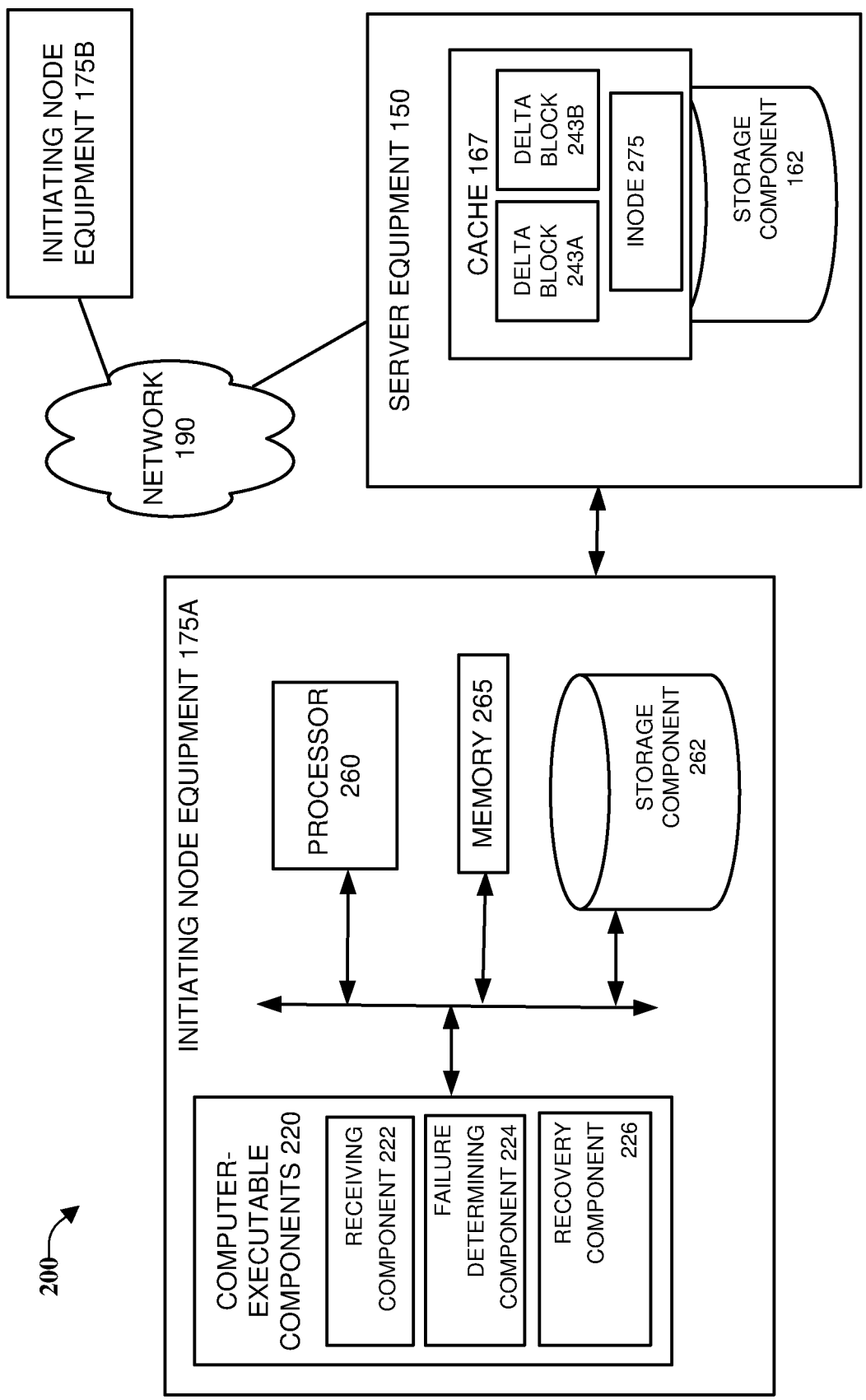
FIG. 2 is an architecture diagram of an example system that can facilitate data recovery by a first updating node when a second updating node abnormally ceases update operations on a data store, in accordance with one or more embodiments.

FIG. 2 is an architecture diagram of an example system 200 that can facilitate data recovery by a first updating node when a second updating node abnormally ceases update operations on a data store, in accordance with one or more embodiments. For purposes of brevity, description of like elements and/or processes employed in other embodiments is omitted. As depicted, system 200 includes initiating node equipment 175A-B and server equipment 150. Initiating node equipment 175A includes processor 260, memory 265, storage component 262, and computer executable components 220. Server equipment 150 includes cache 167 for data updates to storage component 162, with cache 167 including delta blocks 243A-B.

It is noted that, as described further below, delta blocks can also be references as tracked updates and secondary blocks. Generally speaking, in one or more embodiments, delta blocks can be linked to a data structure to be changed, and as such, can be an indicator of lock status to processes accessing the data structure. In additional or alternative embodiments, delta blocks can be blocks of data, each corresponding to concurrent processes modifying particular stored data. Additional details of delta blocks are provided with descriptions of FIGS. 3-5 below.

In embodiments, processor 260 is similar to processor 160 and storage device 262 is similar to storage component 162, discussed above. According to multiple embodiments, memory 265 can store one or more computer and/or machine readable, writable, and/or executable components 220 and/or instructions. In one or more embodiments, computer-executable components 220, when executed by processor 260, can facilitate performance of operations defined by the executable component(s) and/or instruction(s). Computer executable components 220 can include receiving component 222, failure determining component 224, and recovery component 226, and other components described or suggested by different embodiments described herein, e.g., that can improve the operation of system 200, in accordance with one or more embodiments.

In an example implementation of initiating node equipment 175A, memory 265 can store executable instructions that can facilitate generation of receiving component 222, which in some implementations, can receive an allocation of a first delta block cache 243A for a first update to inode 275 corresponding to a file system object stored in a storage component 162 of a data system. Continuing this example implementation example, memory 265 can store executable instructions that can facilitate generation of failure determining component 224, which in some implementations, can determine that a second delta block cache 243B allocated to second initiating node equipment 175B for a second update to the inode is in a condition that indicates that the second update was not completed successfully, resulting in an update failure.

Continuing this example implementation example, memory 265 can store executable instructions that can facilitate generation of failure determining component 224, which in some implementations, can based on the first delta block and the second delta block, facilitate a recovery of data based on the recovery failure.

Additional details of the operation of example embodiments of initiating node equipment are included below, e.g., FIG. 4 describes how nodes can alter stored data blocks to facilitate recovery after a failed update activity, and FIG. 5 describes how extended attributes of inodes can be used to link delta blocks to changed files and system objects.

Figure 3:
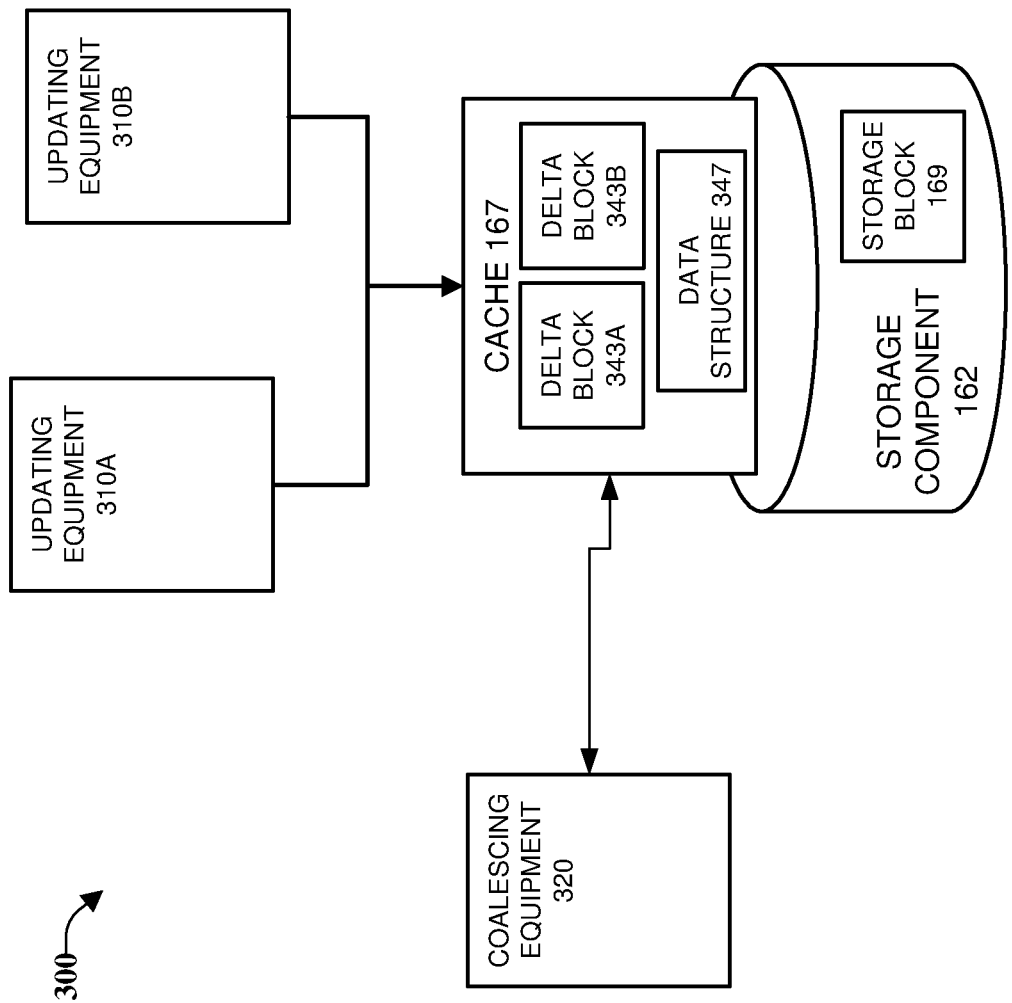
FIG. 3 is an architecture diagram of a non-limiting example system that illustrates recovery when updating nodes abnormally cease update operations.

FIG. 3 is an architecture diagram of a non-limiting example system 300 that illustrates recovery when updating nodes abnormally cease update operations. For purposes of brevity, description of like elements and/or processes employed in other embodiments is omitted. As depicted, system 300 includes coalescing equipment 320 and updating equipment 310A-B coupled to cache 167 of storage component 162. Cache 167 includes delta blocks 343A-B and data structure 347.

In system 300, updating equipment 310A-B are computing devices that operate one or more processes to make updates to data stored in storage blocks 169 of storage component 162. In some circumstances, especially with systems having large amounts of updating equipment, these can be instances that the updating activity of two updating processes overlap in time, causing contention during the updates. In an example that can illustrate different embodiments, when some updating equipment is operating (e.g., updating equipment 310A), the equipment pre-maturely ceases the updating activity. Details of this example are discussed below.

For example, the ceasing of the updating activity can be pre-mature because the full series of updating activity has not been successfully completed, e.g., an atomic transaction has not been executed, and the extend of the changes successfully made cannot be determined by looking at the total changes requested. An additional way that the ceasing of the updating activity can be premature is that data manipulating procedures of the system have not been completed, e.g., changes have not been flushed from caches and written to a journal, in a journaled data system. With both of these examples, there can be issues of data security. An additional example discussed herein involves data manipulating procedures associated with concurrent changes to stored data, e.g., changes subject to locking and a requirement of coherency in updates made by multiple nodes at different times. As described further herein, one or more embodiments can facilitate recovery after a node has gone down in the middle of updating activity subject to contention locking.

In one or more embodiments, one way that updating equipment 310A-B can concurrently submit updating activity for the same portion of storage component 162 is to delta blocks 343A-B with data structure 347. For example, a file or directory that is expected to receive concurrent updates can have a number of delta blocks attached to a related data structure 347 (e.g., an inode of the file or directory) via a new extended attribute added to the data structure to link to a block of data allocated to the changing process, e.g., delta blocks 343A-B linked to data structure 347 and respectively linked to updating equipment 310A-B.

In one or more embodiments, delta blocks start with copies of the data to be modified, the stored data copied is locked to facilitate coherent updates, and changes are made to the copied data in the respective delta blocks 343A-B. In one or more embodiments, when changes to the same stored data is concurrently made to two delta block 343A-B copies, before the delta blocks are flushed to the journal, these two sets of changes are coalesced (also termed reconciled herein) to aggregate the changes in to one set of changes for journaling, e.g., making these updates stable changes to the data store.

Stated differently, this mechanism can, in some embodiments, support concurrent updates from multiple initiator nodes, e.g., each initiator node can allocate its own delta block, and control the allocation of individual address fields within that delta block. Control of updates to different parts of the B-tree data structure 347 can be under a fine-grained distributed lock. On lock contention, in accordance with one or more embodiments, an initiator node can flush entries protected by the contended lock to the B-tree before giving up the lock.

In an example implementation, while the delta blocks can be written to the journal (e.g., cache 167), the updates can be aggregated from the journal and flushed to their final locations in data structure 347 (e.g., a B-tree structure) before the journal is forced to flush the secondary block contents to the disk storage devices, e.g., storage component 162.

Additional details of the operation of example embodiments are included below, e.g., FIG. 4 describes how this structure can facilitate recovery after a failed update activity, and FIG. 5 describes how extended attributes of inodes can be used to link delta blocks to changed files and system objects.

Figure 4:
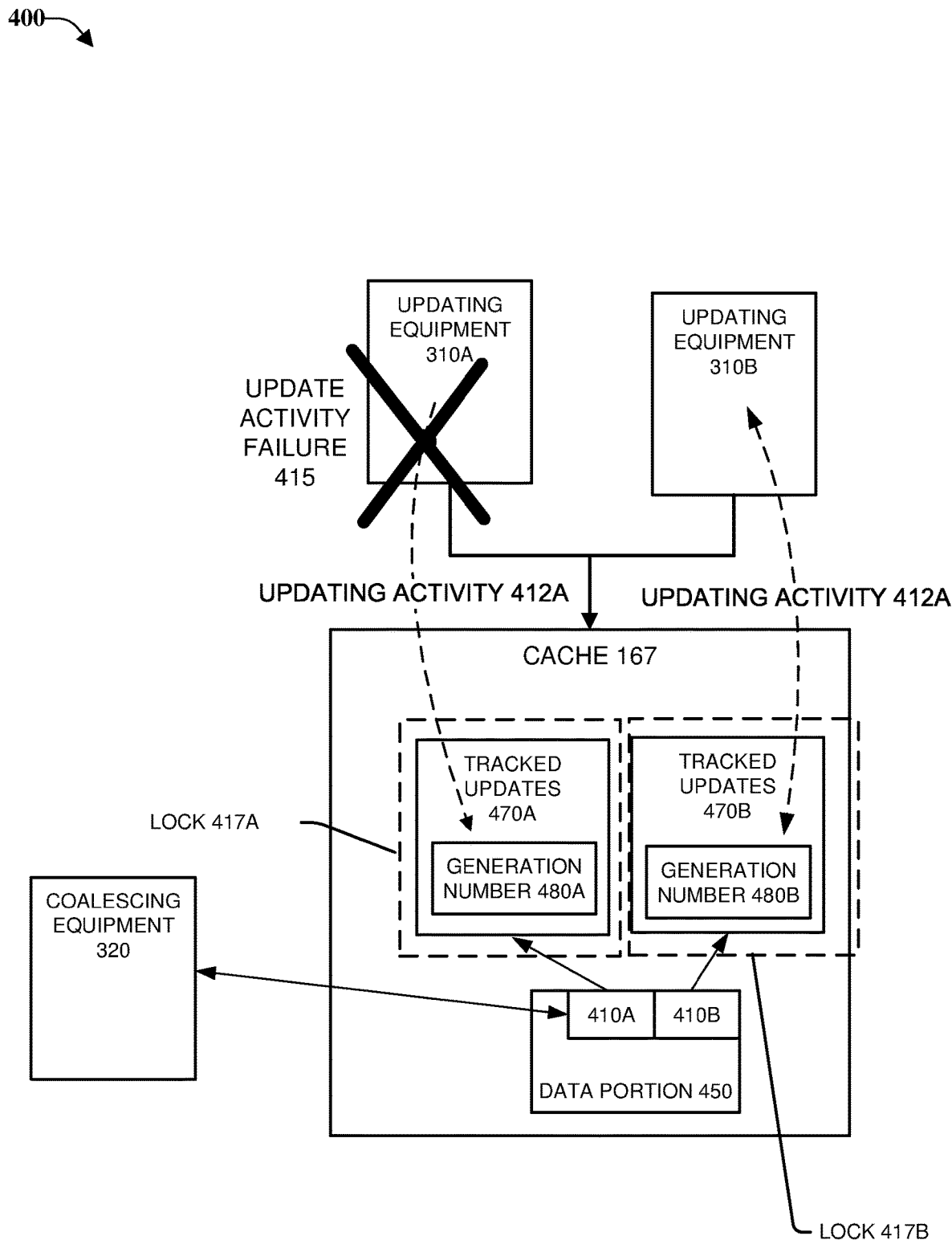
FIG. 4 depicts a diagram of a non-limiting system where recovery after an interruption in data updates occurs with a cached data portion of tracked updates made by updating equipment, in accordance with one or more embodiments.

FIG. 4 depicts a diagram of a non-limiting system 400 where recovery after an interruption in data updates occurs with a cached data portion of tracked updates made by updating equipment, in accordance with one or more embodiments. For purposes of brevity, description of like elements and/or processes employed in other embodiments is omitted. As depicted, system 400 includes coalescing equipment 320 and updating equipment 310A-B coupled to cache 167 of storage component 162. Cache 167 includes delta blocks 470A-B and data portion 450 having extended attributes 410A-B.

One or more embodiments can handle recovery when nodes (e.g., updating equipment 310A-B) go down. For example, in one or more embodiments, updating equipment 310A-B that, respectively stores updates via tracked updates 470A-B, are granted (e.g., by locking component 122) fine-grained locks 417A-B to protect the updates, e.g., attempting to guarantee the journaling and flush of tracked data updates 317A-B before other updating equipment attempt to access or update data portion 450. In some implementations, when updating equipment 310A goes down (e.g., update activity failure 415), as depicted in FIG. 4, lock 417A can be lost, and another mechanism can be used by one or more embodiments to protect data consistency.

An example of this mechanism that can be used by one or more embodiments involves the use of generation numbers 480A-B, e.g., maintained in tracked updates 470A-B for each of updating equipment 310A-B. In one or more embodiments, if updating equipment prematurely ceases updating activity, the generation number of cached updates allocated thereto (e.g., tracked updates 470A allocated to updating equipment 310A) can be incremented before it rejoins the "current group" in the cluster. In one or more embodiments, generation numbers 480A-B can provide a mechanism for determining which blocks of updates (e.g., tracked updates 470A-B) were owned by nodes that went down during updating activity, e.g., which nodes may include entries which are not protected by a fine-grained lock and thus may be out of date. Thus, in an example, tracked first updates 470A include generation number 480A that indicates update activity failure 315 of updating activity 312A.

In one or more embodiments, when an initiator node for a block with a stale generation number rejoins the group of active updating equipment, this node creates new delta blocks for updating activity. The blocks previously used by the rejoining equipment can be treated by the system as if the rejoining node is still down, e.g., when a node comes back up, it will not continue writing to an existing delta block. In one or more embodiments, this can result in 'down' blocks only containing entries that were written before the failing node went down.

Handling "down" delta blocks by embodiments can be further facilitated by allowing these blocks to be updated by any initiator node which holds the find-grained lock for a corresponding entry. For example, because updating equipment 310B also includes a lock 317B on data portion 450, this updating equipment handle aggregating the contents of tracked updates 470A, after the update failure by updating equipment 310A.

In some circumstances, 'down' blocks can only have entries removed, not added, so updating equipment 310B can flush entries to the journal as and when the entries of tracked data 470A collide with new updating activity by other updating equipment. In this example, reads of tracked updates 470A can consider these entries as an overlay to the existing data portion 450, e.g., removing the need for a lock upgrade during read operations.

In an alternative approach, once updating equipment 310A is detected as being down, the in-use cache implementation can be scanned (e.g., a magic directory) to find all logstores controlled by down nodes (e.g., tracked updates 470A-B scanned), with an immediate full flush of the contents of each detected logstore. In addition, in some circumstances, to promote data coherence with other updates, access to stored data (e.g., files and data objects) with updates in a detected logstores can be blocked until the flush is completed. Stated differently, in this alternative approach, updating the generation number could require that the rejoining node reacquire all the fine-grained locks which previously protected the entries in the delta block from the failed updates, and one or more other approaches described herein (e.g., using generation numbers) can avoid this potentially resource intensive result.

Figure 5:
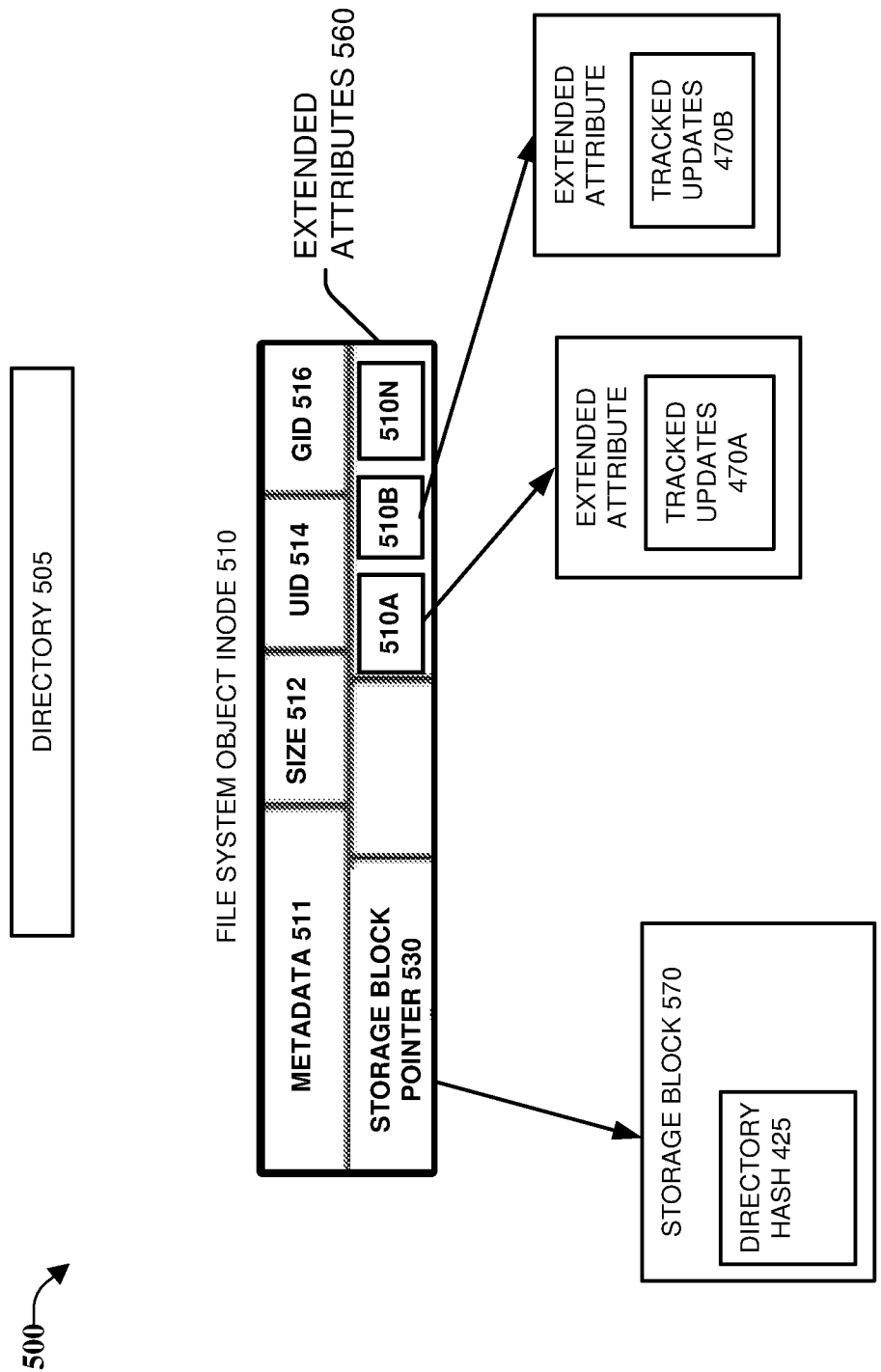
FIG. 5 depicts a diagram of a non-limiting system where an inode can facilitate recovery when updating nodes abnormally cease update operations, in accordance with one or more embodiments.

FIG. 5 depicts a diagram of a non-limiting system 500 where an inode can facilitate recovery when updating nodes abnormally cease update operations, in accordance with one or more embodiments. For purposes of brevity, description of like elements and/or processes employed in other embodiments is omitted. As depicted, system 500 includes directory 505 with metadata stored by file system object inode 510. File system inode includes some sample attributes, e.g., metadata 511, size 512, UID 514, 516, storage block pointer 530, and extended attributes 560. Storage block pointer 530 references physical storage block 570. Extended attributes 510A-B respectively reference tracked updates 470A-B.

In one or more embodiments, the data updates received from updating equipment 310A-B can be data updates a change a description of a file system object, e.g., a directory. File system objects can include, but are not limited to, descriptions of file system objects stored in data structures, such as index node (inode) data structures, which can store the attributes and disk block locations of the data of the file system object. Examples can include file directories, snapshot tracking files (e.g., storing logical inode numbers (LINs) for all files which have data on a snapshot), and system B-trees (SBTs), which can, in some implementation, store administrative information, such as descriptions of data modified by a system operation.

In one or more embodiments, descriptions the above-described file system objects (and references to corresponding inodes) can be stored in data structures adapted to be used to rapidly perform file system functions. Data structures that can be modified by one or more embodiments described herein include file system B-tree data structures that can maintain data to facilitate operations including rapid searching, sequential access, insertions, and deletions, e.g., inode B-trees. Thus, in one or more embodiments, tracked updates 470A-B can be b-tree data structures attached to file system object inode 510, with this data structure containing copies of updating activity (e.g., delta block entries) local nodes (e.g., updating equipment 310A-B).

Figure 6:
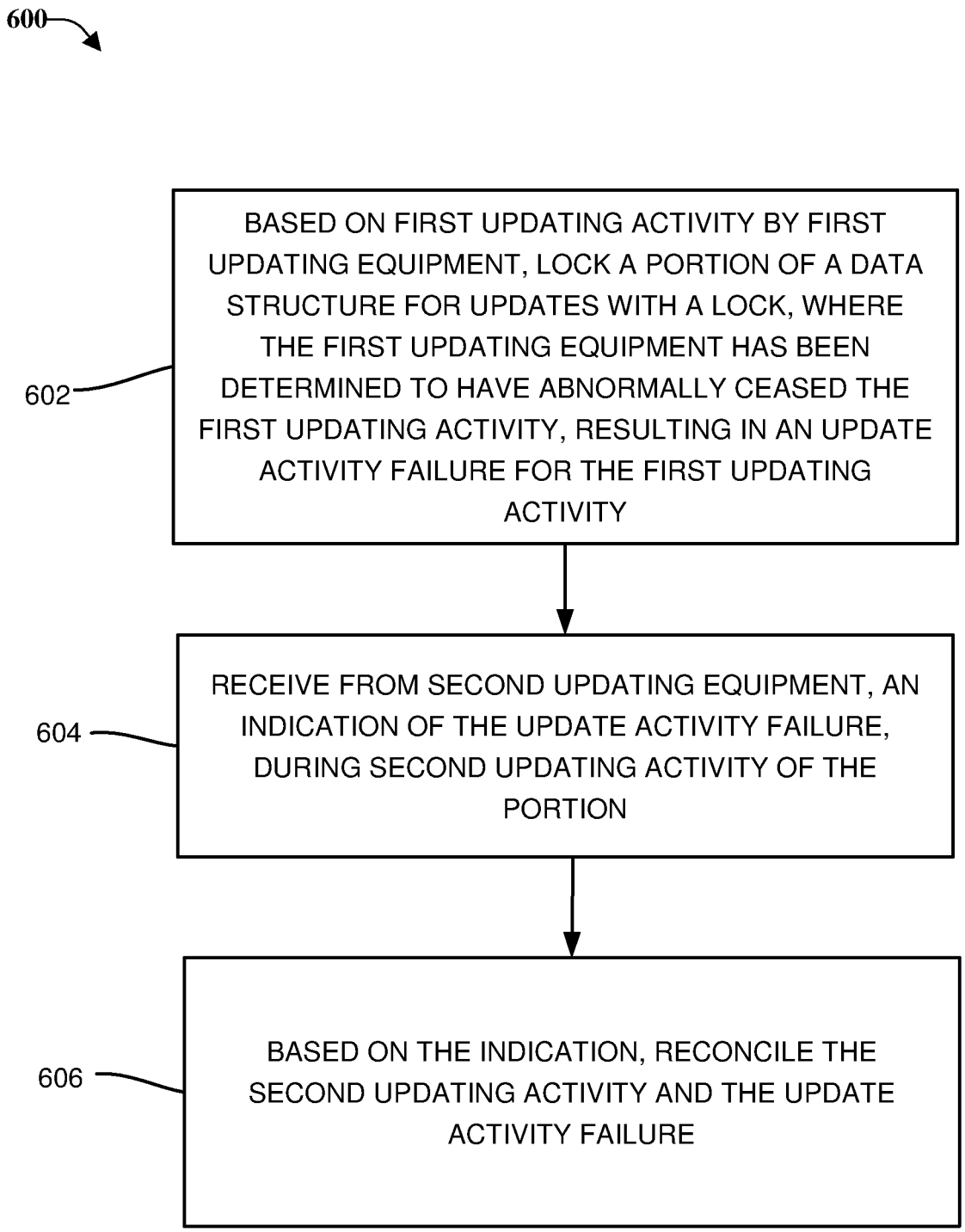
FIG. 6 depicts a flow diagram representing example operations of an example method that can facilitate recovery when updating nodes abnormally cease update operations, in accordance with one or more embodiments.

FIG. 6 depicts a flow diagram representing example operations of an example method 600 that can facilitate recovery when updating nodes abnormally cease update operations, in accordance with one or more embodiments. For purposes of brevity, description of like elements and/or processes employed in other embodiments is omitted.

In some examples, one or more embodiments of method 600 can be implemented by receiving component 122, locking component 124, reconciling component 126, and other components that can be used to implement aspects of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, receiving component 122 can, in one or more embodiments, based on first updating activity by first updating equipment, lock a portion of a data structure for updates with a lock, where the first updating equipment has been determined to have abnormally ceased the first updating activity, resulting in an update activity failure for the first updating activity. At 604 of method 600, locking component 124 can, in one or more embodiments receive from second updating equipment, an indication of the update activity failure, during second updating activity of the portion. At 606 of method 600, reconciling component 126 can, in one or more embodiments, based on the indication, reconcile the second updating activity and the update activity failure.

Figure 7:
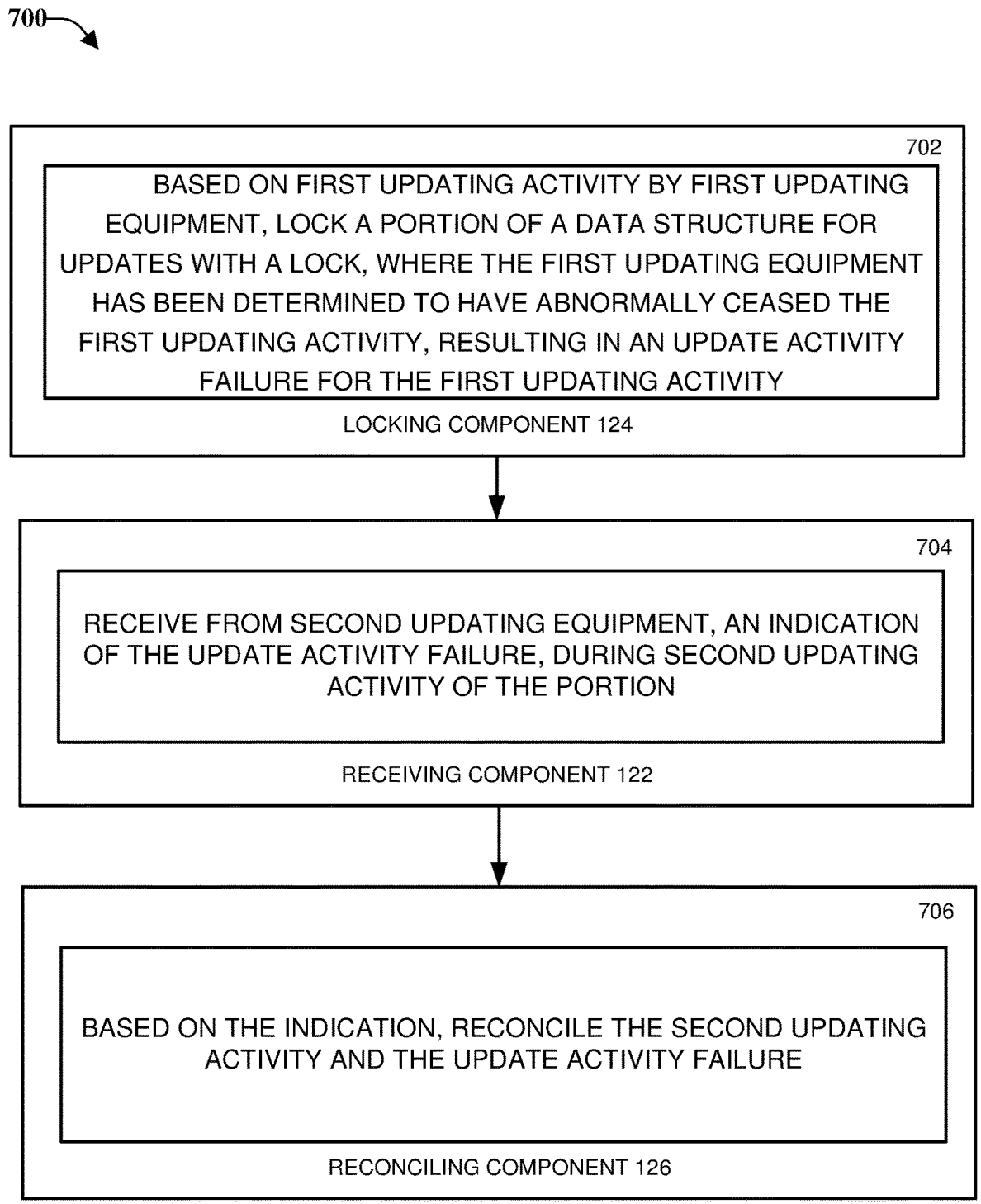
FIG. 7 depicts an example system that can facilitate recovery when updating nodes abnormally cease update operations, in accordance with one or more embodiments.

FIG. 7 depicts an example system 700 that can facilitate recovery when updating nodes abnormally cease update operations, in accordance with one or more embodiments. For purposes of brevity, description of like elements and/or processes employed in other embodiments is omitted. Example system 700 can include receiving component 122, locking component 124, reconciling component 126, and other components that can be used to implement aspects of system 700, as described herein, in accordance with one or more embodiments.

At 702 of FIG. 7, receiving component 122 can based on first updating activity by first updating equipment, lock a portion of a data structure for updates with a lock, where the first updating equipment has been determined to have abnormally ceased the first updating activity, resulting in an update activity failure for the first updating activity. At 704 of FIG. 7, locking component 124 can receive from second updating equipment, an indication of the update activity failure, during second updating activity of the portion. At 706 of FIG. 7, reconciling component 126 can, based on the indication, reconcile the second updating activity and the update activity failure.

Figure 8:
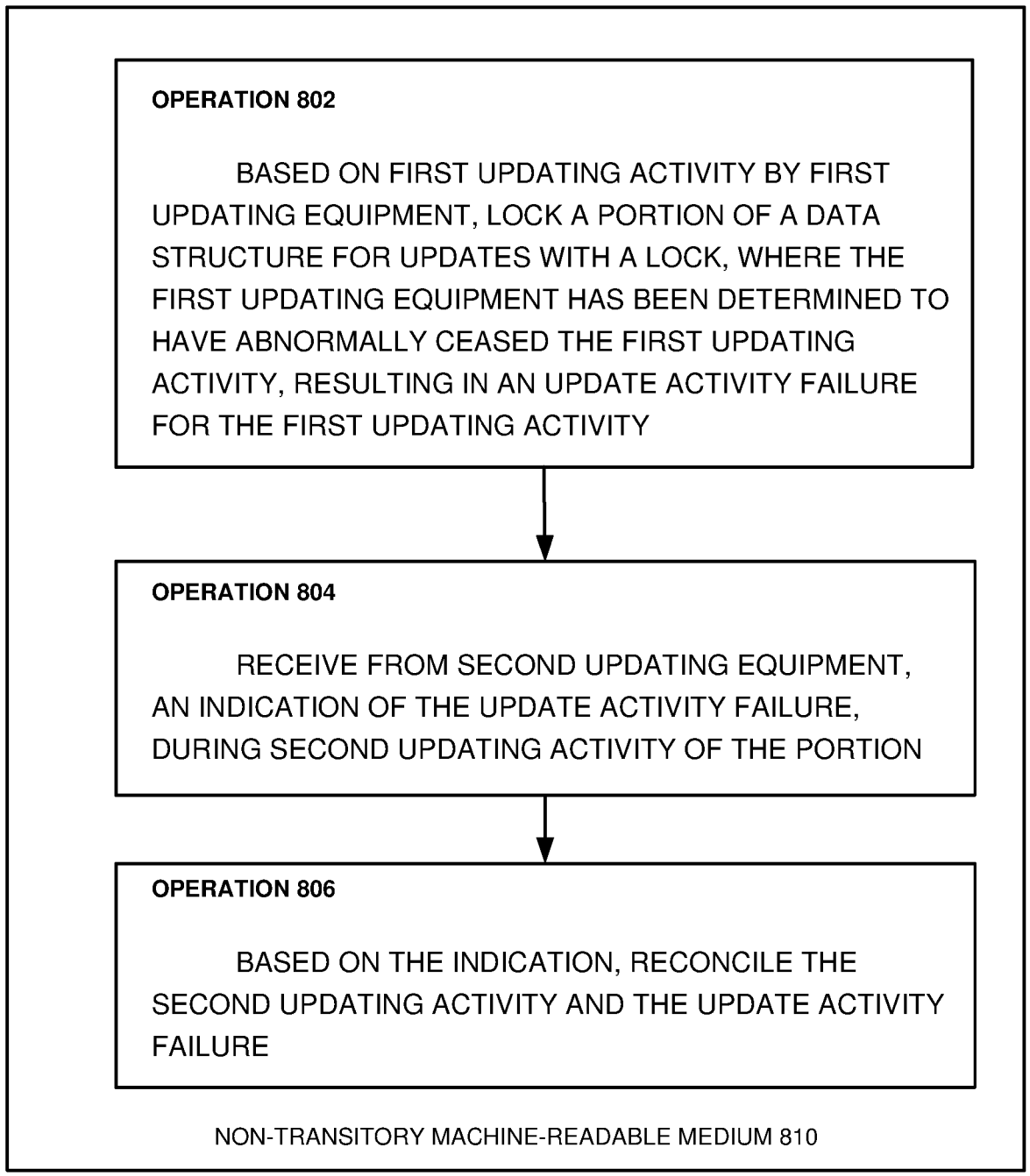
FIG. 8 depicts an example non-transitory machine-readable medium that can include executable instructions that, when executed by a processor of a system, can facilitate recovery when updating nodes abnormally cease update operations.

FIG. 8 depicts an example non-transitory machine-readable medium 800 that can include executable instructions that, when executed by a processor of a system, can facilitate recovery when updating nodes abnormally cease update operations. For purposes of brevity, description of like elements and/or processes employed in other embodiments is omitted.

Operation 802 of FIG. 8 can facilitate generation of locking component 124 which, in one or more embodiments, can based on first updating activity by first updating equipment, lock a portion of a data structure for updates with a lock, where the first updating equipment has been determined to have abnormally ceased the first updating activity, resulting in an update activity failure for the first updating activity. Operation 804 of FIG. 8 can facilitate generation of receiving component 122, which, in one or more embodiments, can receive from second updating equipment, an indication of the update activity failure, during second updating activity of the portion. Operation 806 of FIG. 8 can facilitate generation of reconciling component 126 which, in one or more embodiments, can, based on the indication, reconcile the second updating activity and the update activity failure.

Figure 9:
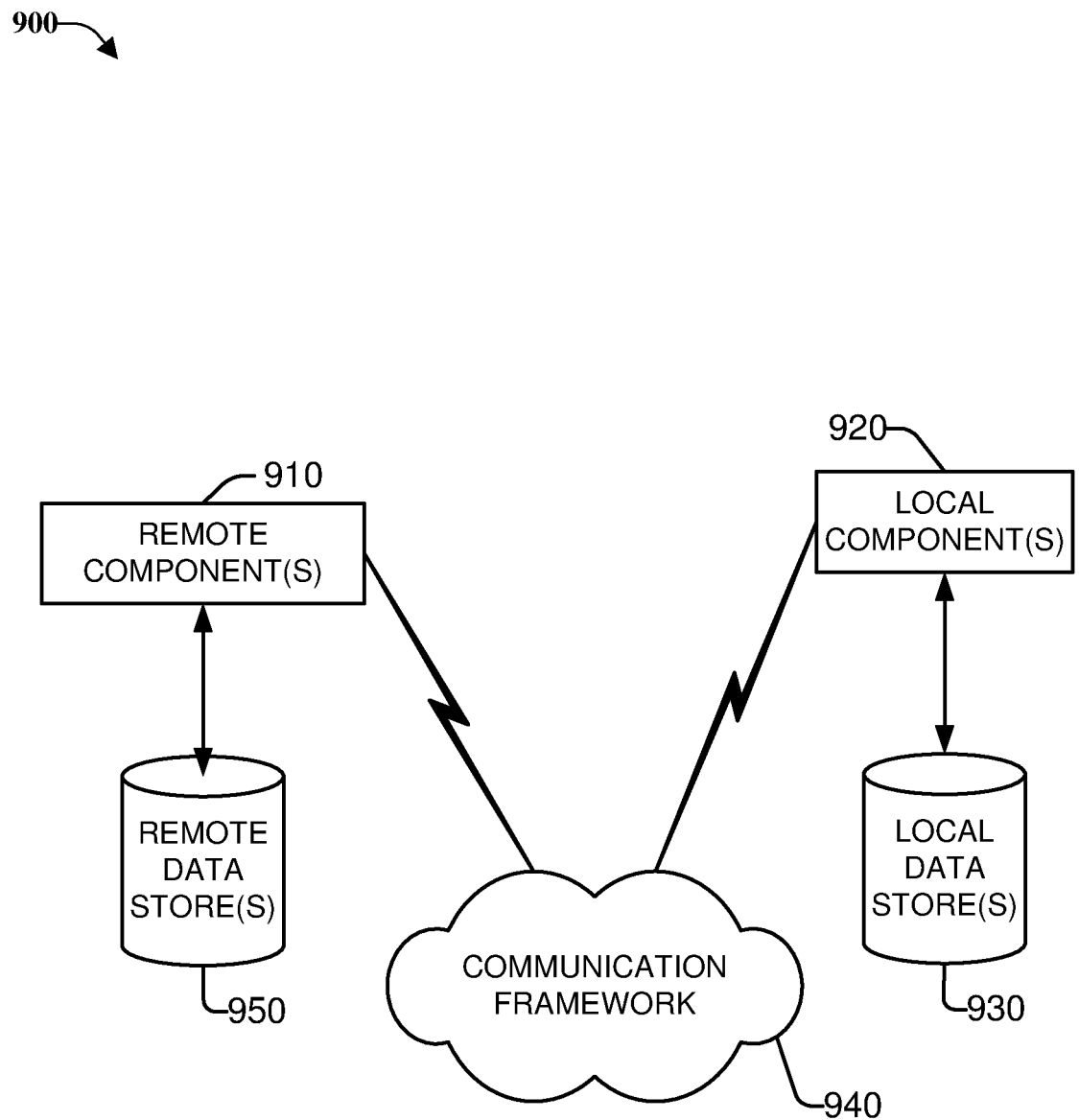
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
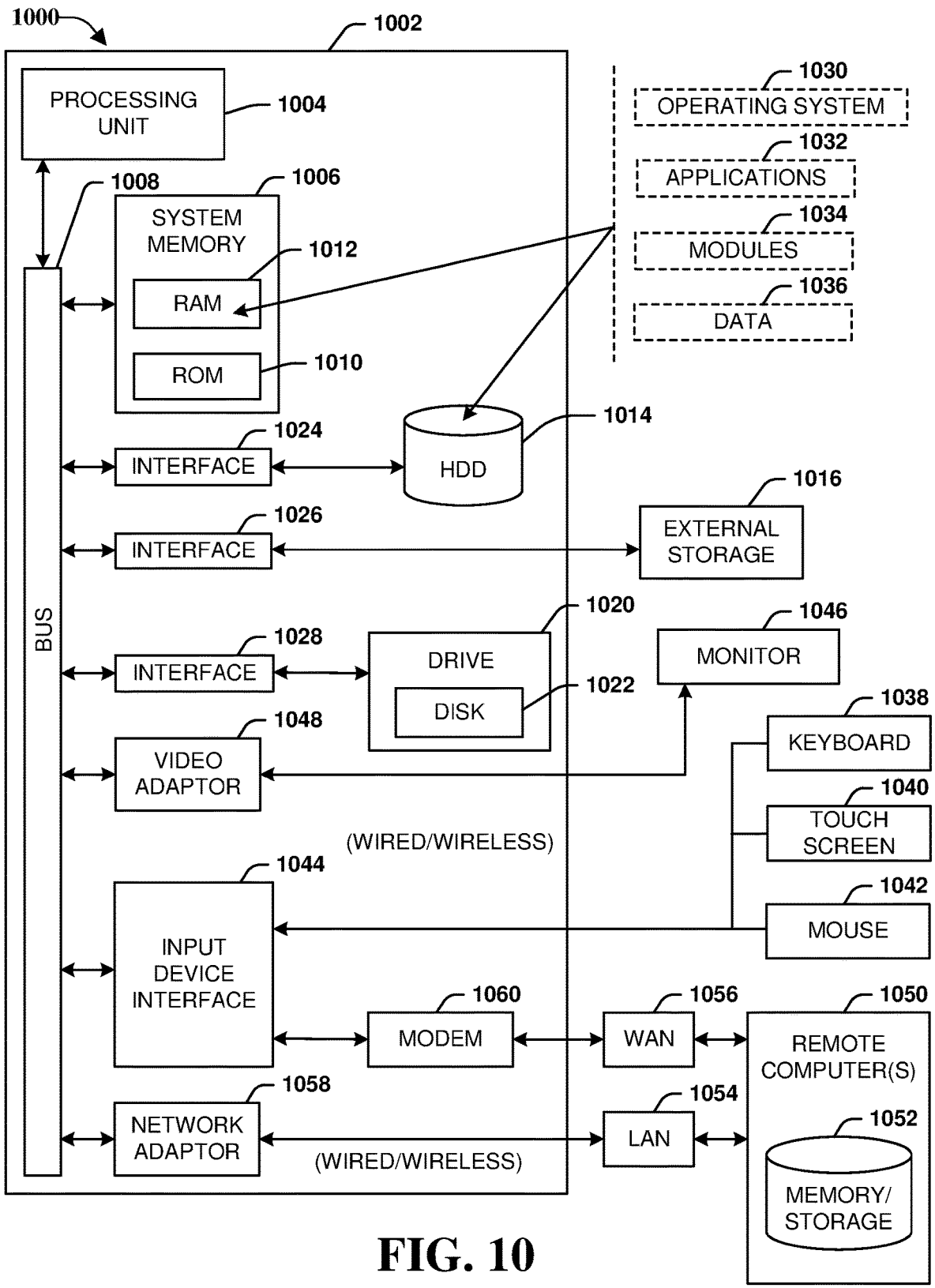
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any datastream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
based on first updating activity by first updating equipment, locking, by computing equipment comprising a processor, a portion of a data structure for updates with a lock, wherein the first updating equipment has been determined to have abnormally ceased the first updating activity, resulting in an update activity failure for the first updating activity;
receiving, by the computing equipment, from second updating equipment, an indication of the update activity failure, during second updating activity of the portion; and
based on the indication, reconciling, by the computing equipment, the second updating activity and the update activity failure.

2. The method of claim 1, wherein locking the portion comprises changing a first attribute of the portion, and wherein changing the first attribute locks the portion for the first updating activity.

3. The method of claim 2, wherein the lock is a first lock, and further comprising, based on the second updating activity, changing, by the computing equipment, a second attribute of the portion, wherein changing the second attribute provides a second lock of the portion for updating that is concurrent to the first lock, and wherein changes to the first attribute and the second attribute respectively provide a first link and a second link to tracked first updates and tracked second updates to the portion by the first updating activity and the second updating activity.

4. The method of claim 3, wherein the portion comprises an inode, wherein the first attribute comprises an extended attribute of the inode, and wherein the first link comprises a link to a data block that comprise the tracked first updates.

5. The method of claim 3, wherein the second updating equipment identified the update activity failure based on analysis, by the second updating equipment, of the tracked first updates.

6. The method of claim 5, wherein the tracked first updates comprise a generation number that indicates that the first updating equipment abnormally ceased the first updating activity, and wherein the second updating equipment identified the update activity failure based on analysis of the generation number.

7. The method of claim 6, wherein reconciling the second updating activity and the update activity failure comprises aggregating the tracked first updates and the tracked second updates based on the generation number.

8. The method of claim 6, wherein the generation number indicates that the tracked first updates comprise data that are out of date.

9. The method of claim 5, wherein the reconciling the second updating activity and the update activity failure comprises aggregating the tracked first updates and the tracked second updates based on a removal of conflicting first updates by the second updating equipment based on the analysis by the second updating equipment.

10. The method of claim 3, further comprising, based on third updating activity by the first updating equipment, changing, by the computing equipment, a third attribute of the portion to provide a new link to tracked third updates of the portion.

11. The method of claim 1, further comprising, based on the indication, removing, by the computing equipment, the lock of the portion.

12. The method of claim 1, wherein the indication of the update activity failure from the second updating equipment enables recovery from the update activity failure without a recovery pass of the data structure.

13. First initiating node equipment, comprising:
a memory that stores computer executable components; and
a processor that executes the computer executable components stored in the memory, wherein the computer executable components comprise:
  a receiving component that receives an allocation of a first delta block cache for a first update to an inode corresponding to a file system object stored in a data system,
  a failure determining component that determines that a second delta block cache allocated to second initiating node equipment for a second update to the inode is in a condition, wherein the condition indicates that the second update was not completed successfully, resulting in an update failure, and
  a recovery component that, based on the first delta block cache and the second delta block cache, facilitates a recovery of data based on the update failure.

14. The first initiating node equipment of claim 13, wherein facilitating the recovery comprises, based on an analysis of entries in the second delta block cache, discarding entries from the second delta block cache that conflict with other entries.

15. The first initiating node equipment of claim 13, wherein facilitating the recovery comprises, removing a lock granted to the second initiating node equipment for the second update.

16. The first initiating node equipment of claim 13, wherein facilitating the recovery comprises, based on an analysis of entries in the second delta block cache, committing entries from the second delta block cache to a journal of the data system.

17. A non-transitory machine-readable medium comprising executable instructions that, when executed by a processor of a data coalescing device, facilitate performance of operations, the operations comprising:
  based on first data manipulation activity by a first data manipulation device, locking with a first lock, a portion of stored data for updates with a lock, wherein the first data manipulation activity has been determined to have abnormally terminated, resulting in an update failure for the first data manipulation activity;
  receiving from a second data manipulation device, an indication of the update failure, identified by the second data manipulation device during second data manipulation activity based on a second lock of the portion of the stored data; and
  based on the indication, sending information to the second data manipulation device to facilitate maintaining the portion of the stored data in a coherent state after the update failure.

18. The non-transitory machine-readable medium of claim 17, wherein the portion of the stored data comprises an inode describing a file system object, and wherein locking the inode with the first lock comprises changing an extended attribute of the inode to indicate that the inode is locked for the first data manipulation activity.

19. The non-transitory machine-readable medium of claim 17, wherein the operations further comprise, based on the indication, removing the first lock from the portion of the stored data.

20. The non-transitory machine-readable medium of claim 17, wherein the information sent to the second data manipulation device comprises information corresponding to other data updates that are in conflict with results of the update failure.

* * * * *